Nov. 3, 1959   W. M. McKENZIE   2,910,938
TYPE-HOLDER
Filed Feb. 4, 1957
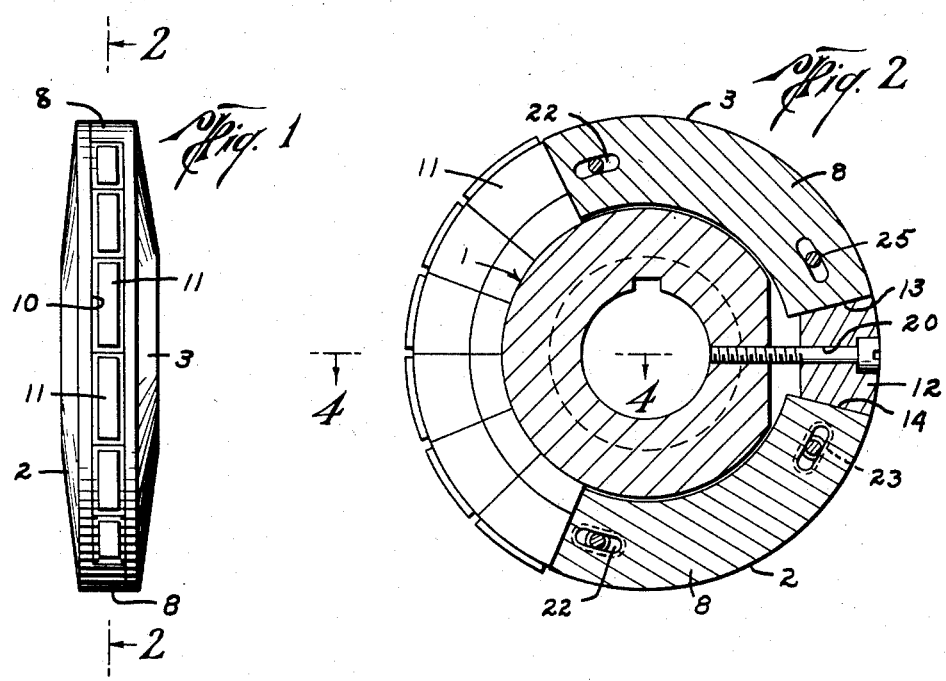
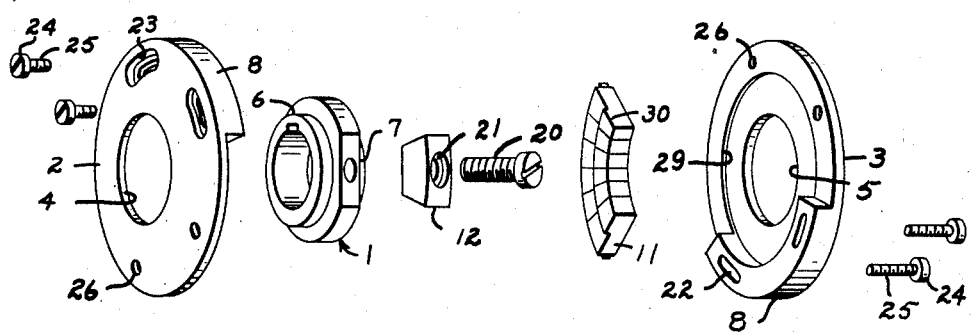
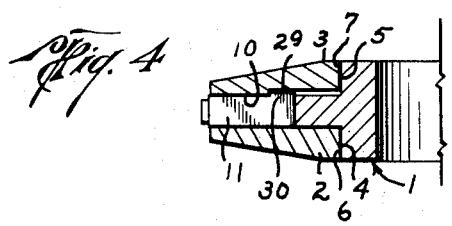
Wilfred M. McKenzie
INVENTOR.
BY Ray L. Smith
ATTORNEY

United States Patent Office 2,910,938
Patented Nov. 3, 1959

2,910,938

TYPE-HOLDER

Wilfred M. McKenzie, Houston, Tex., assignor to Hughes Tool Company, Houston, Tex., a corporation of Delaware Application February 4, 1957, Serial No. 638,061

4 Claims. (Cl. 101—377)

This invention relates to a roll type die holder to be mounted upon a shaft and rolled upon a surface to form an imprint of the dies upon such surface.

An object of the invention is to provide a type or die holder in which the type or die members are securely held in place at all times.

Another object is to provide a roller type of die holder which is so constructed that the component parts thereof may be adjusted to rigidly reclamp the type or die members when such members become slightly deformed from rigorous use to which they are subjected when in normal use.

A more specific object is to provide a holder comprising, in a preferred form, side plates and inwardly extending lugs interfitting in a manner to provide a recess for a font of type and a second recess for a wedge and means for moving the wedge to maintain the font of type secure within the first mentioned recess.

Other objects and advantages of the invention will be more fully apparent from the following description and the accompanying drawings in which:

Fig. 1 is an elevational view of a holder embodying the invention;

Fig. 2 is a sectional view taken on line 2—2 in Fig. 1;

Fig. 3 is an exploded view in side perspective of the embodiment shown in Figs. 1 and 2;

Fig. 4 is a detail sectional view on line 4—4 of Fig. 2 showing a die or type in place within the holder.

The embodiment disclosed comprises a hub member 1, adapted to be mounted upon a shaft, and a pair of side plates 2 and 3 having central openings 4 and 5 to fit upon reduced end portions 6 and 7 of the hub.

Each of the side plates 2 and 3 has an axially extending lug 8 so that these lugs interfit in angularly spaced relation when the plates are assembled in side by side relation upon the hub 1. The lugs 8 are of such height that there is formed a slot or recess 10 of sufficient transverse dimension to receive the type or die blocks 11. The arcuate extent of these lugs is also such that the slot 10 is of a length to receive the desired number of type and spacer blocks to imprint desired information, and also to provide a space or recess opposite the type slot 10 to receive a wedge block 12 having its converging side faces riding upon the end faces 13, 14 of the lugs 8.

The wedge block 12 has a hole therein to receive screw 20 which enters complementary threaded hole 21 so that turning of the screw to advance the wedge toward the axis of rotation of the holder causes the wedge 12 to force the lugs 8 apart and consequently to reduce the arcuate extent of the slot 10.

In order to permit this relative rotational movement between the side plates 2 and 3 the lug portion of each of these plates is provided with one or more arcuate slots 22 counterbored at 23 to receive the head 24 of a screw 25. The opposing side plate has a threaded opening 26 opposite each of these slots so that, upon tightening of all of the screws 25, all parts of the holder assembly and the type 11 therein are held in assembled relation.

It is also to be noted that the side plate 3 is recessed at 29 concentric of its axis so that lugs 30 on the type or die 11 fit therein. Thus the type 11 is held within the slot 10 and with the inner end of the type in engagement with the periphery of the medial flange portion of the hub 1.

By way of further description and explanation of assembly, adjustment and use of the holder it will be assumed that the end plate 3 is laid upon a flat surface and a font of type and spacers of sufficient arcuate extent to fill the slot 10 is placed thereon, the lugs 30 on the type entering the recess 29 and the inner ends of the type being in abutment with the periphery of the hub 1. The screw 20 is loosened so that the wedge 12 may move to an outer position to provide sufficient space for the lug 8 on the plate 2 to enter between the front of type and the wedge.

Plate 2 is then superposed upon the assembly as thus far described, the reduced end portion 6 of the hub 1 entering the central opening in the plate as the lug 8 enters between the font of type and the wedge 12. Screws 25 are then inserted and tightened sufficiently to hold all parts in assembled relation. Screw 20 is tightened to move the wedge 12 inwardly and force the lugs 8 apart whereby the font of type is wedged tightly endwise in the slot 10. Screws 25 are now fully tightened and the holder is fully assembled ready for use.

It seems apparent that any endwise looseness of the font of type due to slight deformation thereof or of the holder from stresses set up in the holder when in normal use may be readily compensated by tightening of the screw 20. Hence, satisfactory operation and long life of the holder are assured.

The invention claimed is:

1. A roll type die holder assembly comprising a pair of opposed side plates each having an axially extending lug, said plates being interconnected with the lugs interfitting and forming a first recess adapted to receive a font of type and a second recess annularly spaced therefrom, and wedge means in said second recess engageable with said lugs and movable radially of the assembly to produce relative rotation between the plates and effect clamping action upon the ends of the font of type.

2. A roll type die holder assembly comprising a pair of opposed side plates each having an axially extending lug, said plates being interconnected with the lugs interfitting and forming a first recess adapted to receive a font of type and a second recess annularly spaced therefrom, wedge means in said second recess engageable with said lugs and movable radially of the assembly to produce relative rotation between the plates and effect clamping action upon the ends of the font of type, and additional means for producing axial clamping action upon the side plates and the font of type.

3. A roll type die holder assembly comprising a pair of opposed circular side plates each having an arcuate axially extending lug, said lugs interfitting and forming spaced annular recesses in the holder, one of said recesses being adapted to receive a font of type, means for restraining said type from radial outward movement from within the recess, a wedge in the other of said recesses, and having its side faces in engagement with the end faces of said lugs, and means for moving said wedge radially inwardly to produce relative rotation between the side members to clamp the font of type within said first mentioned recess.

4. A roll type die holder comprising, two generally circular side members having axial openings therein, a hub fitting within said openings and having a peripheral flange extending radially between the side members, a pair of lugs interposed between the side members outwardly of said flange, said lugs being circumferentially spaced and forming with the side members and the periphery of said flange an arcuate recess for a font of type and a second arcuate recess spaced from said first mentioned recess and adapted to receive a radially movable wedge, a wedge in said second recess, means for moving said wedge to move said lugs into clamping engagement with a font of type within said first mentioned recess, and means for producing a transverse clamping action upon said side members so that the component parts of the holder and a font of type therein are secured in assembled relation.

References Cited in the file of this patent

UNITED STATES PATENTS

| | | |
|---|---|---|
| 94,432 | Neale | Aug. 31, 1869 |
| 1,643,349 | Sanders | Sept. 27, 1927 |
| 2,358,674 | Weber | Sept. 19, 1944 |
| 2,409,409 | Wild et al. | Oct. 15, 1946 |

FOREIGN PATENTS

| | | |
|---|---|---|
| 465,631 | Germany | Sept. 24, 1928 |